United States Patent
Murata (10) Patent No.: US 8,171,901 B2
(45) Date of Patent: May 8, 2012

(54) INTERNAL COMBUSTION ENGINE WITH VARIABLE VALVE GEAR

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 298 days.

(21) Appl. No.: 12/709,938

(22) Filed: Feb. 22, 2010

(65) Prior Publication Data
US 2010/0212618 A1    Aug. 26, 2010

(30) Foreign Application Priority Data
Feb. 23, 2009   (JP) .................................. 2009-039237

(51) Int. Cl.
*F01L 1/34*    (2006.01)

(52) U.S. Cl. .................. 123/90.15; 123/90.17; 123/347; 123/348

(58) Field of Classification Search ............... 123/90.15, 123/90.17, 347, 348
See application file for complete search history.

(56) References Cited

U.S. PATENT DOCUMENTS
8,061,316 B2 * 11/2011 Yoshika et al. ............ 123/90.16

FOREIGN PATENT DOCUMENTS
| JP | 3-202602 A | 9/1991 |
|----|------------|--------|
| JP | 5-133212 A | 5/1993 |
| JP | 2004-211699 A | 7/2004 |
| JP | 2007-309120 A | 11/2007 |
| JP | 2008-82188 A | 4/2008 |
| JP | 2008-267300 A | 11/2008 |

* cited by examiner

*Primary Examiner* — Ching Chang
(74) *Attorney, Agent, or Firm* — Birch, Stewart, Kolasch & Birch, LLP (57) ABSTRACT

In an engine which comprises a first intake valve and a second intake valve for each cylinder, configured to be driven by a first intake cam and a second intake cam, respectively, and a cam phase change mechanism configured to vary the phase of the second intake cam, the cam phase change mechanism is controlled so that the opening timing of the second intake valve is advanced ahead of that of the first intake valve in a start mode.

3 Claims, 8 Drawing Sheets

CROSS SECTION A-A

INTERNAL COMBUSTION ENGINE WITH VARIABLE VALVE GEAR

BACKGROUND OF THE INVENTION

1. Field of the Invention

The present invention relates to an internal combustion engine with a cam phase change mechanism capable of changing the phase of an intake cam.

2. Description of the Related Art

Conventionally, there are internal combustion engines that comprise a cam phase change mechanism as a variable valve gear, which changes the phase of an intake cam to vary the opening and closing timings of an intake valve. Further, a technique has been developed in which the cam phase change mechanism is applied to internal combustion engines that are provided with a plurality of intake valves for each cylinder. According to this technique, the opening and closing timings of only some of the intake valves are varied in accordance with the load and engine speed.

In one such internal combustion engine, the opening and closing timings of some of the intake valves are delayed in, for example, a high-speed, high-load mode, whereby the open period of the intake valves, including those which are not subjected to delay-angle control, is extended to increase the flow rate of intake air for the security of output. In order to secure an appropriate compression ratio, as in a low-speed, high-load start mode, on the other hand, the delay angle of the intake valves is limited (Jpn. Pat. Appln. KOKAI Publication No. 3-202602).

Since the delay angle of the intake valves are limited in the start mode, according to the technique described in the above patent document, however, the intake valves share the same open period, so that flows of intake air interfere with one another, thereby suppressing generation of swirls, in a combustion chamber. Thus, combustibility may be reduced, possibly resulting in a reduction in exhaust performance.

SUMMARY OF THE INVENTION

The object of the present invention is to provide an internal combustion engine with a variable valve gear, capable of securing swirls to improve its exhaust performance in a start mode.

In order to achieve the above object, the present invention provides an internal combustion engine with a variable valve gear, which comprises a first intake valve and a second intake valve for each cylinder, configured to be driven by a first intake cam and a second intake cam, respectively, and a cam phase change mechanism configured to vary the phase of the second intake cam, wherein the internal combustion engine comprises control means for controlling the cam phase change mechanism so that the opening timing of the second intake valve is advanced ahead of that of the first intake valve in a start mode.

Thus, the opening timing of the second intake valve is advanced ahead of that of the first intake valve in the start mode, so that swirls are generated as only the second intake valve opens in an initial stage of an intake valve-open period. Accordingly, gasification of fuel and its mixing with air can be accelerated to improve combustibility and exhaust performance in the start mode.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIGS. 6A to 6C are time charts showing the lifts of intake valves, in which FIGS. 7A and 7B are reference diagrams showing swirls, in which

DETAILED DESCRIPTION OF THE PREFERRED EMBODIMENTS

One embodiment of the present invention will now be described with reference to the accompanying drawings.

Figure 1:
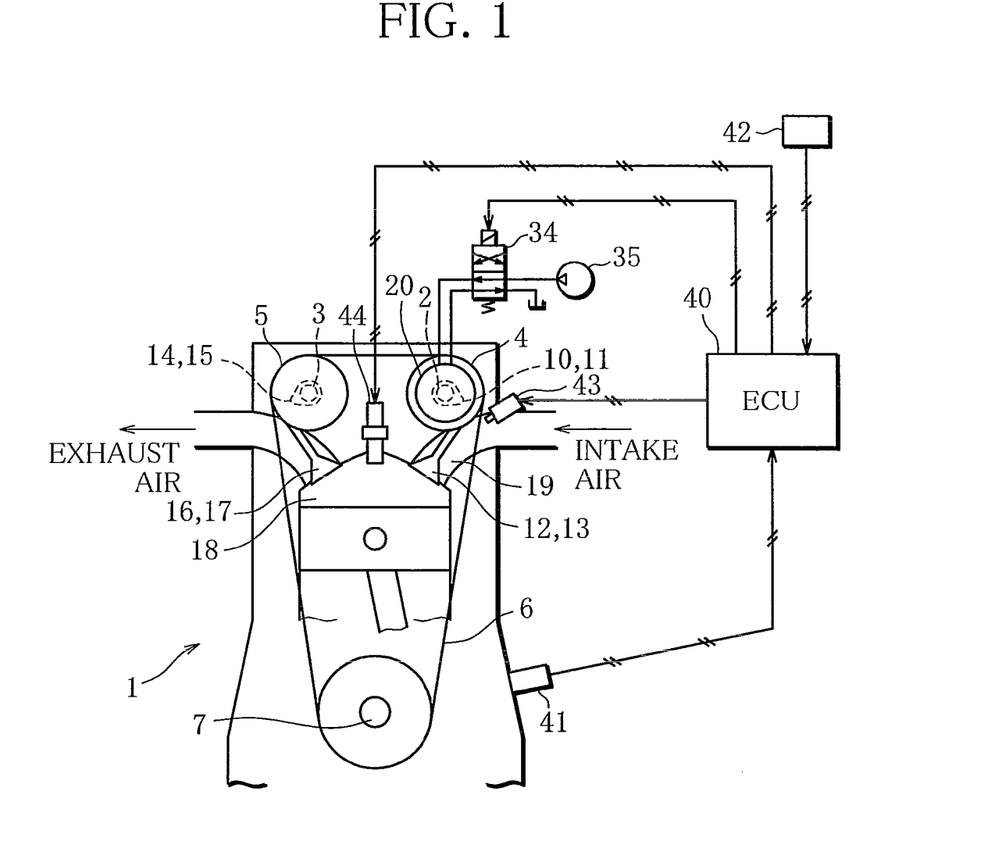
FIG. 1 is a schematic structure diagram of an engine according to one embodiment of the invention.

FIG. 1 is a schematic structure diagram of an internal combustion engine (engine 1) with a variable valve gear according to the present embodiment.

As shown in FIG. 1, the engine 1 of the present embodiment comprises a DOHC valve train. Cam sprockets 4 and 5 are connected, respectively, to the respective front ends of an intake camshaft 2 and an exhaust camshaft 3 of the engine 1. The cam sprockets 4 and 5 are coupled to a crankshaft 7 by a chain 6. As the crankshaft 7 rotates, the intake and exhaust camshafts 2 and 3 are rotated together with the cam sprockets 4 and 5. Intake valves 12 and 13 are opened and closed by intake cams 10 and 11 on the intake camshaft 2, and exhaust valves 16 and 17 by exhaust cams 14 and 15 on the exhaust camshaft 3. A combustion chamber 18 of the engine 1 is pent-roof-shaped.

Figure 2:
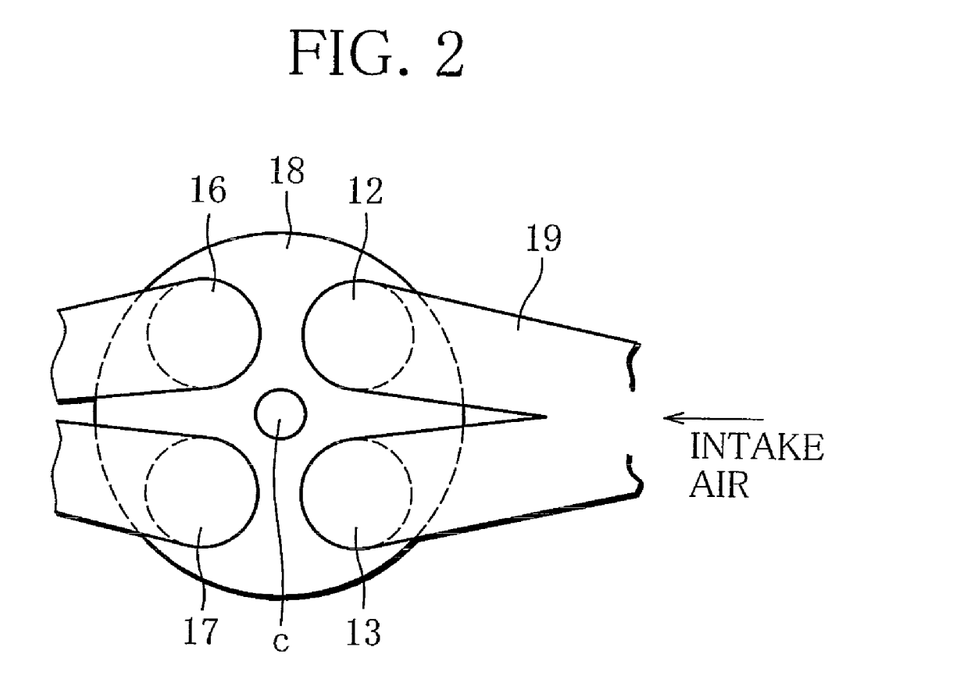
FIG. 2 is a reference diagram showing a layout of valves and a port.

FIG. 2 is a reference diagram showing a layout of the valves and a port of the engine 1.

As shown in FIG. 2, each cylinder of the engine 1 is provided with two intake valves (first and second intake valves 12 and 13) and two exhaust valves 16 and 17. The first and second intake valves 12 and 13 are arranged longitudinally on the right (as in FIG. 2) of a central part c of the combustion chamber 18. The two exhaust valves 16 and 17 are arranged longitudinally on the left of the central part c of the chamber 18.

Further, an intake port 19 of the engine 1 extends obliquely toward the combustion chamber 18 from a position off to the upper right of it, branches off at a point just short of the chamber 18, and communicates with valve holes that are opened and closed by the first and second intake valves 12 and 13, individually.

Furthermore, the valve train of the second intake valve 13 comprises a cam phase change mechanism 20 that varies the phase of the second intake cam 11.

Figure 3:
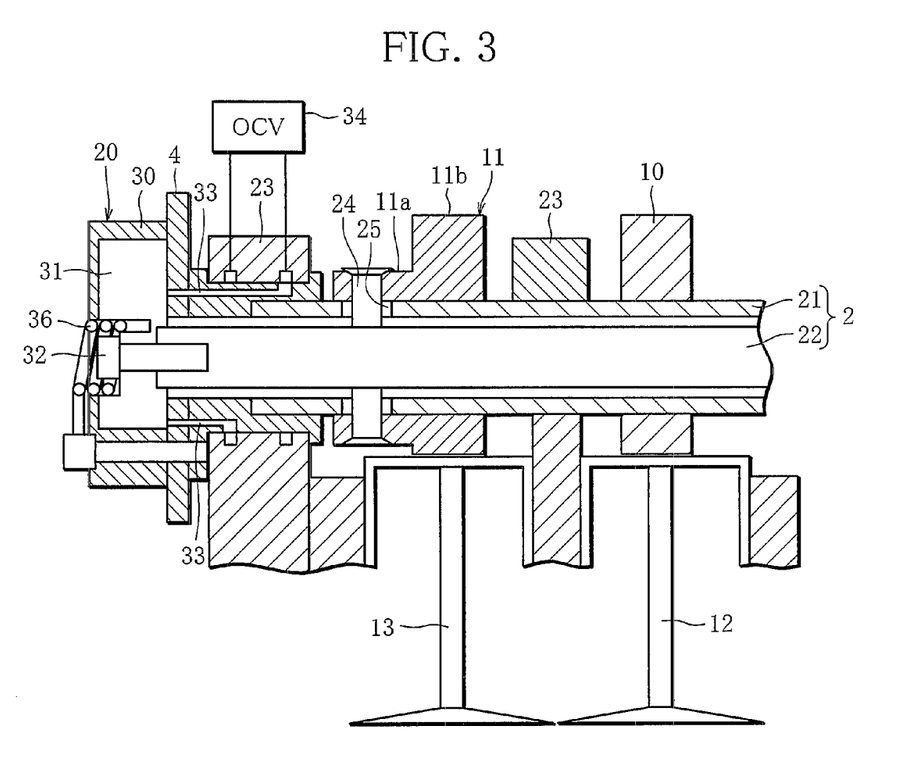
FIG. 3 is a longitudinal sectional view showing the structure of a valve train.
Figure 4:
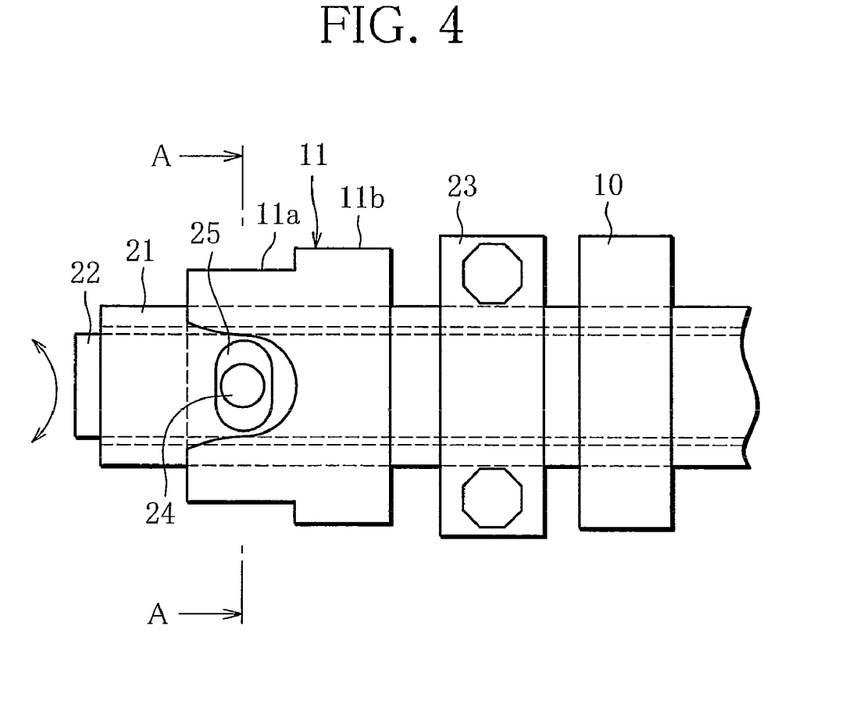
FIG. 4 is a top view showing the structure of the valve train.
Figure 5:
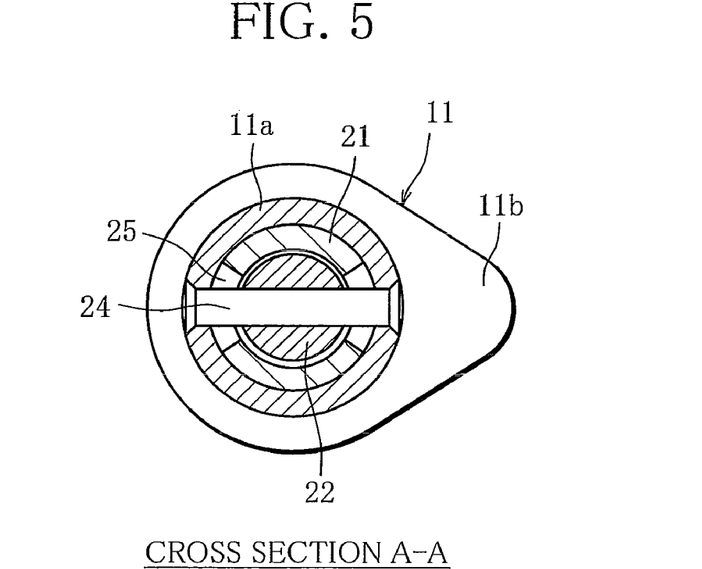
FIG. 5 is a sectional view showing the structure of a mounting portion for the second intake cam.

FIGS. 3 to 5 are structure views of valve trains. FIG. 3 is a longitudinal sectional view, FIG. 4 is a top view, and FIG. 5 is a sectional view showing the structure of a mounting portion for the second intake cam 11.

As shown in FIGS. 3 to 5, the intake camshaft 2 has a dual structure comprising a hollow first intake camshaft 21 and a second intake camshaft 22 inserted in the first intake camshaft. The first and second intake camshafts 21 and 22 are arranged concentrically with a gap between them and pivotably supported by a support portion 23 formed on a cylinder head of the engine 1. The first intake cam 10 for driving the first intake valve 12 is fixed to the first intake camshaft 21. Further, the second intake cam 11 is pivotably supported on the first intake camshaft 21. The second intake cam 11 comprises a substantially cylindrical support portion 11a and a cam portion 11b. The first intake camshaft 21 is inserted in the support portion 11a. The cam portion 11b protrudes from the outer periphery of the support portion 11a and serves to drive the second intake valve 13. The second intake cam 11 and the second intake camshaft 22 are fixed to each other by a fixing pin 24. The fixing pin 24 penetrates the support portion 11a of the second intake cam 11 and the first and second intake camshafts 21 and 22. The fixing pin 24 is inserted in a hole in the second intake camshaft 22 without a substantial gap, and its opposite end portions are crimped and fixed to the support portion 11a. A slot 25 through which the fixing pin 24 is passed is formed in the first intake camshaft 21 so as to extend circumferentially.

The cam phase change mechanism 20 is disposed on one end portion of the first intake camshaft 21. The mechanism 20 is a conventional vane-type cam phase change mechanism configured so that a vane rotor 31 is pivotably disposed in a housing 30, which is integral with the cam sprocket 4, and that the second intake camshaft 22 is fastened to the vane rotor 31 by a bolt 32.

Further, the cam phase change mechanism 20 is provided with a spring 36. The spring 36 is disposed between the housing 30 and the vane rotor 31 and serves to urge the rotor 31 in an advance-angle direction. Thus, the second intake cam 11 is urged in the advance-angle direction.

The cam phase change mechanism 20 is connected with an oil control valve (hereinafter referred to as OCV) 34 by an oil passage 33 formed in the first intake camshaft 21 and the support portion 23. The cam phase change mechanism 20 can continuously adjust the phase angle of the second intake camshaft 22 relative to the cam sprocket 4, that is, the opening and closing timings of the second intake valve 13, in such a manner that the vane rotor 31 is pivoted by a hydraulic fluid supplied from an oil pump 35 of the engine 1 to an oil chamber defined between the vane rotor 31 and the housing 30 as the OCV 34 is switched, as shown in FIG. 1.

An ECU 40 (control means) is provided with an input-output device (not shown), storage devices such as ROM and RAM, central processing unit (CPU), etc., and generally controls the engine 1.

Various sensors, such as a crank angle sensor 41 and a throttle sensor 42, are connected to the input side of the ECU 40. The crank angle sensor 41 detects the crank angle of the engine 1. The throttle sensor 42 detects the opening of a throttle valve (not shown). Further, a fuel injection valve 43, spark plug 44, etc., as well as the OCV 34, are connected to the output side of the ECU 40. The ECU 40 determines the ignition timing, injection quantity, etc., based on detected information from the sensors, and drivingly controls the spark plug 44 and the fuel injection valve 43. In addition, the ECU 40 drivingly controls the OCV 34, that is, the cam phase change mechanism 20.

Figure 6A:
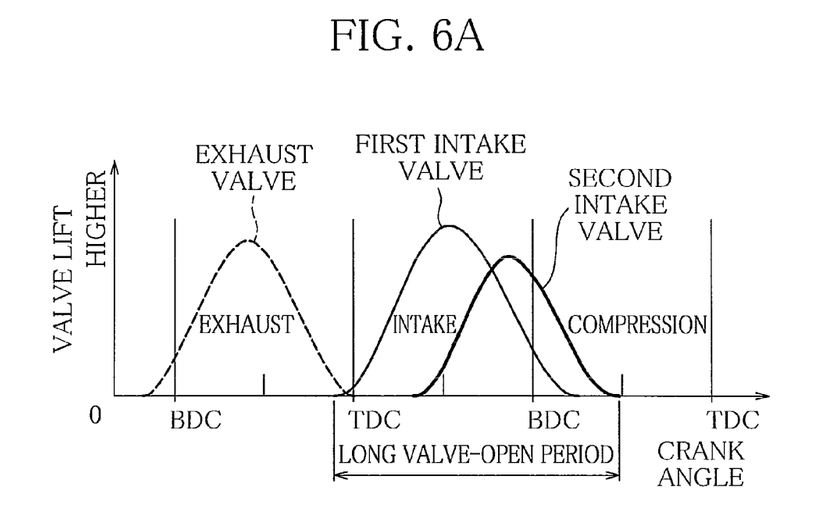
FIG. 6A shows a low-load mode.
Figure 6B:
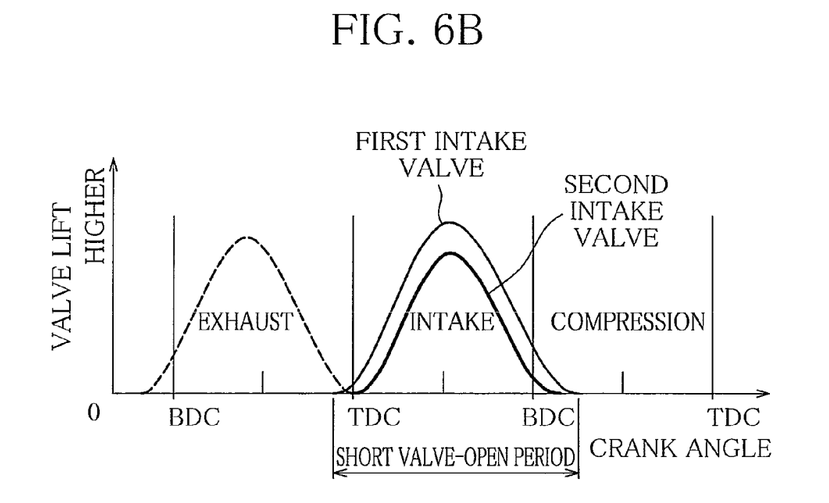
FIG. 6B shows a high-speed, high-load mode.
Figure 6C:
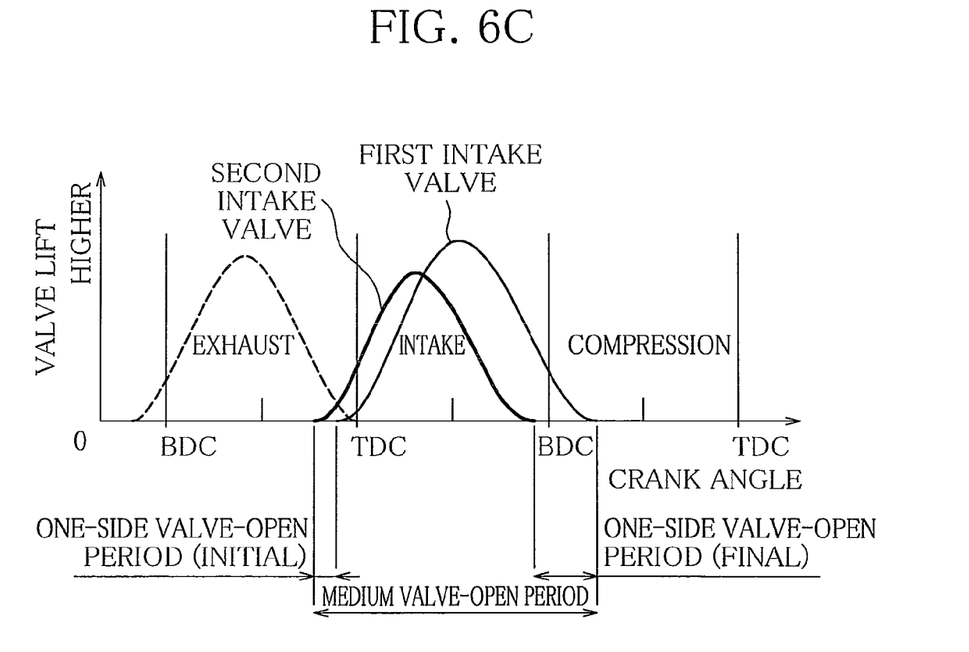
FIG. 6C shows a start mode.

FIGS. 6A to 6C are time charts showing the lifts of the intake valves, in which FIG. 6A shows a low-load mode, FIG. 6B shows a high-speed, high-load mode, and FIG. 6C shows a start mode.

In the present embodiment, as shown in FIGS. 6A to 6C, the valve-opening timing is fixed near the top dead center, while the closing timing of the first intake valve 12 is fixed near a region where intake air is pushed back into the intake port 19 by a piston.

Based on input signals from the crank angle sensor 41 and the throttle sensor 42, the ECU 40 obtains an engine speed N and a load L, and based on these engine speed and load, operatively controls the operatively controlled variable of the cam phase change mechanism 20, that is, the opening and closing timings of the second intake valve 13.

Specifically, the ECU 40 delays the opening and closing timings of the second intake valve 13 in the low-load mode, as shown in FIG. 6A. When this is done, the intake valve-open period is a period between the opening timing of the first intake valve 12 and the closing timing of the delayed second intake valve 13, and it is longer than in the case where the second intake valve 13 is not delayed. At this time, moreover, the closing timing of the second intake valve 13 is set nearer to the top dead center (TDC) than to the bottom dead center (BDC) in a most delayed mode.

In the high-speed, high-load mode, as shown in FIG. 6B, on the other hand, the ECU 40 sets the delay amount of the opening and closing timings of the second intake valve 13 to be lower than in the low-load mode shown in FIG. 6A so that the open period of the second intake valve 13 is within that of the first intake valve 12.

In the start mode, as shown in FIG. 6C, moreover, the ECU 40 advances the opening and closing timings of the second intake valve 13. If this is done, the opening timing of the second intake valve 13 is advanced ahead of that of the first intake valve 12, and the open period of the second intake valve 13 overlaps those of the exhaust valves 16 and 17.

Thus, according to the present embodiment, the valve-open period is extended in the low-load mode, so that a pumping loss can be mitigated to improve the fuel efficiency. Since the opening timing of the first intake valve 12 is set near the top dead center, a pumping loss in an initial stage of an intake stroke can also be mitigated.

In the high-speed, high-load state, on the other hand, the closing timing of the second intake valve 13 is advanced ahead of that of the first intake valve 12, so that the closing timing of the intake valve means as a whole is set in the first half of a compression stroke and near the region where intake air is pushed back into the intake port 19 by the piston, so that the charging efficiency of the intake air can be enhanced to secure the output.

Figure 7A:
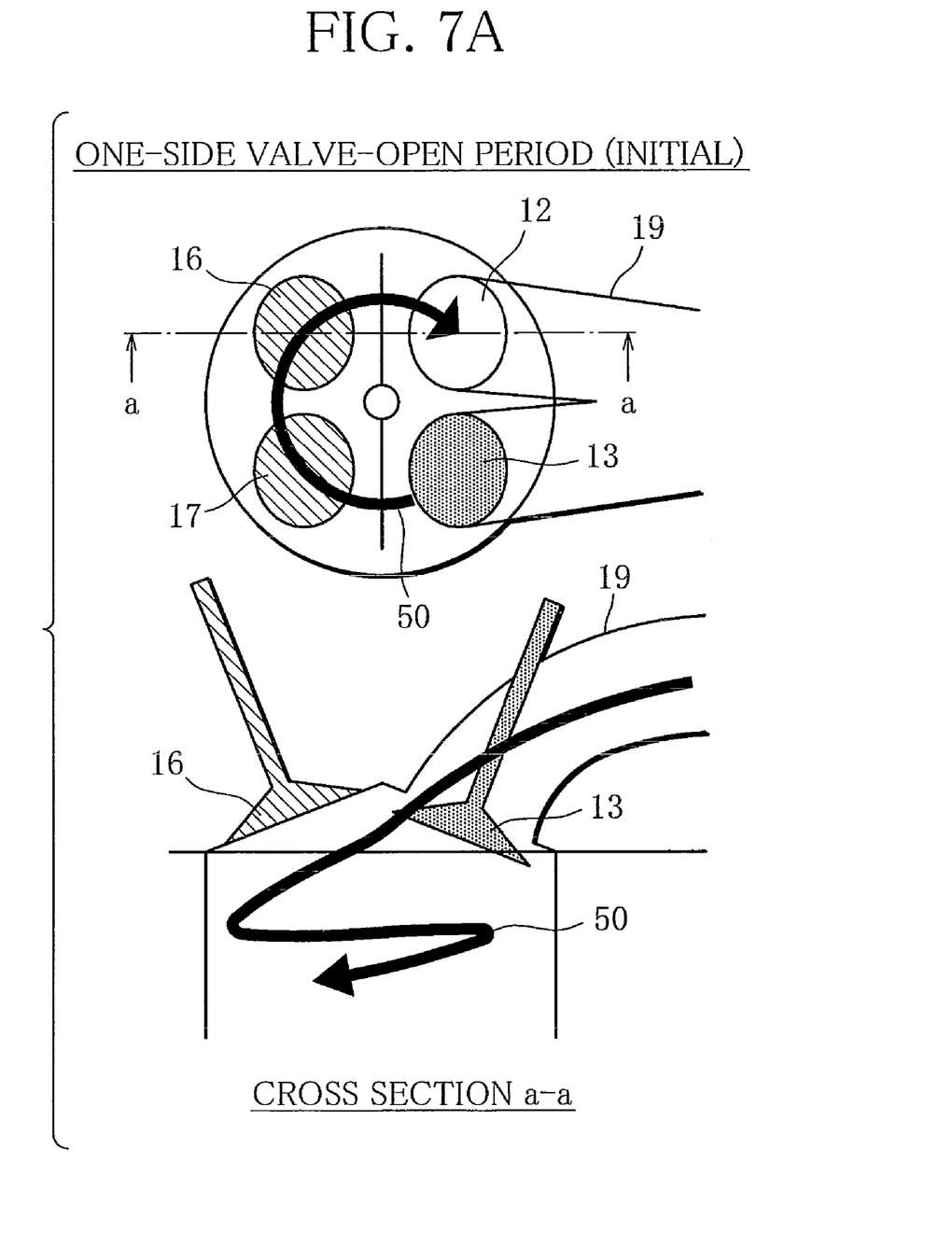
FIG. 7A shows an initial stage of an intake stroke during a one-side valve-open period in the start mode.

In the start mode, as shown in FIG. 7A, the opening and closing timings of the second intake valve 13 are advanced to provide a one-side valve-open period during which only the second intake valve 13 opens in an initial stage of the intake valve-open period. Thereupon, clockwise swirls are generated to accelerate mixing of fuel and air and gasification of fuel, so that the engine can be started with a small amount of fuel, and combustibility can be improved to enhance the exhaust performance. Since the exhaust valves 16 and 17 have a large overlap, moreover, the intake air blows back into the intake port 19 when the intake valves are opened and sweeps and atomizes the fuel that adheres to the intake port 19. Thus, as the intake air temperature is increased by the exhaust, gasification of the fuel can be accelerated to improve combustibility.

Further, exhaust gas containing a plenty of unburned fuel is discharged into an exhaust port in the second half of an exhaust stroke. Since the throttle valve (not shown) is closed, however, a negative pressure is formed in the intake port, so that the exhaust gas once discharged in the second half of the exhaust stroke is sucked out to the intake port side. Then, the exhaust gas is sucked in again and burned, so that unburned fuel components are reduced. If the intake and exhaust valves are located individually on opposite slopes of the pent-roof-shaped combustion chamber, in this case, the exhaust gas is smoothly sucked out to the intake port side and sucked in again in the next stroke. Then, liquid fuel adhering to the wall surface of the intake port is blown away, whereupon gasification of the fuel is accelerated together with mixing of air and fuel and of internal EGR gas and unburned fuel components. Thus, the discharge of unburned fuel is further reduced. In addition, swirls are also generated in the combustion chamber as the exhaust gas is sucked out to the intake port side, so that mixing is also accelerated.

Figure 7B:
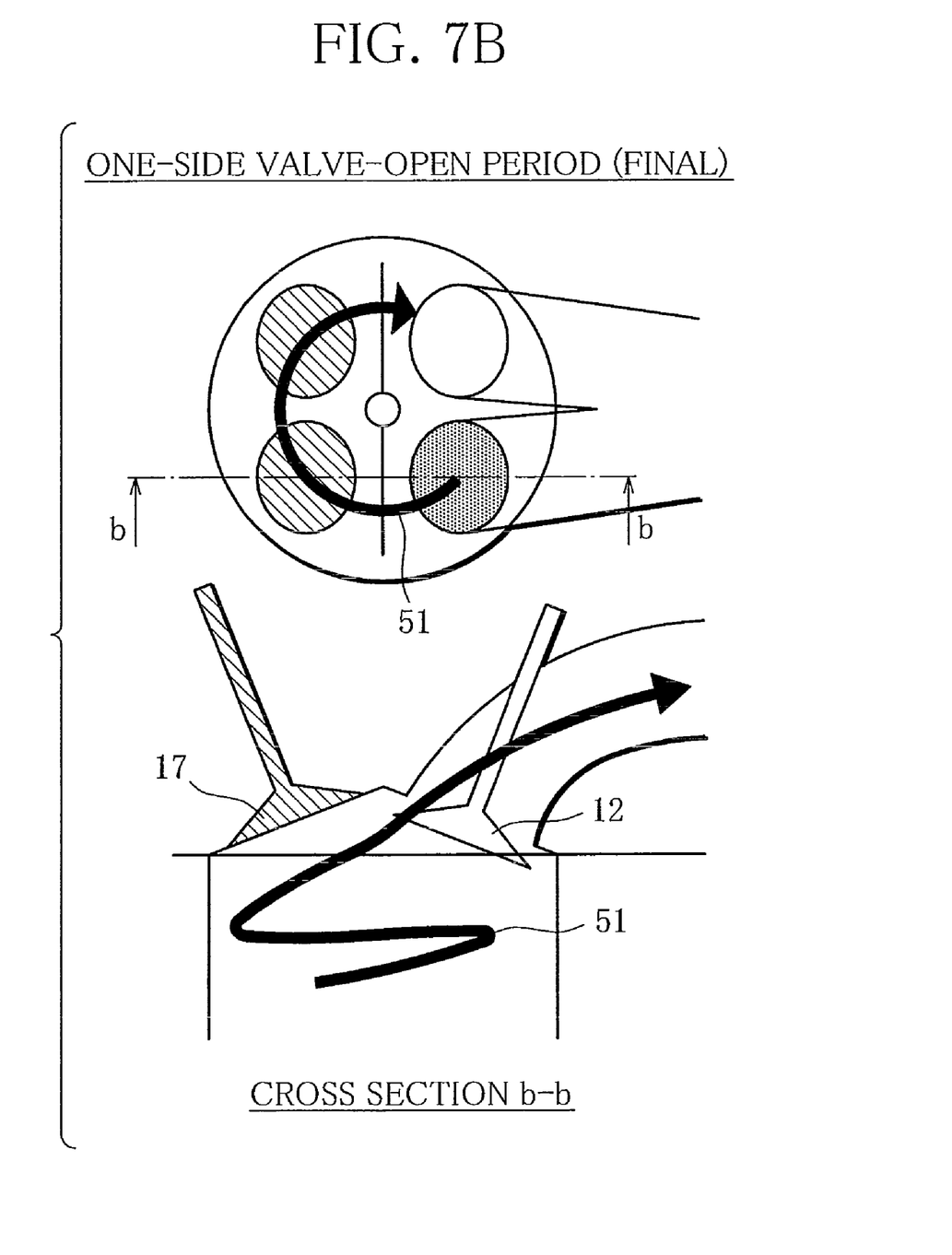
FIG. 7B shows a compression stroke during the one-side valve-open period in the start mode.

As shown in FIG. 7B, furthermore, the open period of the second intake valve 13 is set to be shorter than that of the first intake valve 12. Since a one-side valve-open period during which only the first intake valve 12 opens is provided in a final stage of the intake valve-open period, therefore, the gas mixture once sucked in is pushed back into the intake port 19. Thereupon, clockwise swirls can be enhanced to accelerate gasification of fuel, thereby improving combustibility. While the gas mixture pushed back into the intake port is sucked in again in the next stroke, moreover, the gasification and mixing are advanced beforehand, so that combustibility is further improved.

According to the present embodiment, the valve holes that are opened and closed individually by the first and second intake valves on one slope of the wall surface of the pent-roof-shaped combustion chamber are located at an offset from the center of the combustion chamber, and the intake port 19 extends from the right. Since the combustion chamber 18 is pent-roof-shaped, therefore, the intake air passed through the intake port 19 can easily smoothly flow in to the left. Thus, swirls can be enhanced while one of the valves is open.

In the start mode, moreover, the closing timing of the second intake valve 13 is not delayed behind that of the first intake valve 12, so that ignitability can be secured without reducing the actual compression ratio. Thus, the fuel consumption in the start mode can be reduced, so that an increase in the HC content of the exhaust gas can be suppressed to further improve the exhaust performance. Since the actual compression ratio can be kept high, furthermore, the output performance can be suitably maintained.

The present invention is not limited to the three modes of operation setting for the cam phase change mechanism 20 shown in FIGS. 6A to 6C, and these modes may be set in a continuously variable manner based on the properties of the engine, for example.

What is claimed is:

1. An internal combustion engine with a variable valve gear, which comprises a first intake valve and a second intake valve for each cylinder, configured to be driven by a first intake cam and a second intake cam, respectively, and a cam phase change mechanism configured to vary the phase of the second intake cam, wherein the internal combustion engine comprises control means for controlling the cam phase change mechanism so that the opening timing of the second intake valve is advanced ahead of that of the first intake valve in a start mode, and that the opening timing of the second intake valve is delayed than that of the first intake valve in a predetermined low-load mode, and the second intake cam is set so that the open period of the second intake valve is shorter than that of the first intake valve.

2. The internal combustion engine with a variable valve gear according to claim 1, wherein the control means controls the cam phase change mechanism so that the open period of the second intake valve overlaps that of an exhaust valve in the start mode.

3. The internal combustion engine with a variable valve gear according to claim 2, wherein the control means controls the cam phase change mechanism so that the open period of the intake valves begins at the opening timing of the first intake valve and ends at the closing timing of the second intake valve in the predetermined low-load mode.

* * * * *